(12) United States Patent
Rodatz et al.

(10) Patent No.: US 8,808,630 B2
(45) Date of Patent: Aug. 19, 2014

(54) EXHAUST GAS CATALYTIC CONVERTER SYSTEM AND METHOD FOR OPERATING AN EXHAUST GAS CATALYTIC CONVERTER

(75) Inventors: Paul Rodatz, Landshut (DE); Michael Nienhoff, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 13/979,267

(22) PCT Filed: Jan. 5, 2012

(86) PCT No.: PCT/EP2012/050157
§ 371 (c)(1),
(2), (4) Date: Jul. 11, 2013

(87) PCT Pub. No.: WO2012/095355
PCT Pub. Date: Jul. 19, 2012

(65) Prior Publication Data
US 2013/0287657 A1    Oct. 31, 2013

(30) Foreign Application Priority Data
Jan. 12, 2011   (DE) .......................... 10 2011 008 380

(51) Int. Cl.
| | |
|---|---|
| G05D 9/00 | (2006.01) |
| F01N 3/18 | (2006.01) |
| F01N 3/20 | (2006.01) |
| B01D 53/94 | (2006.01) |

(52) U.S. Cl.
USPC ............. 422/108; 422/110; 422/111; 60/274; 60/301; 423/213.2

(58) Field of Classification Search
CPC .............. F01N 3/208; F01N 2560/026; F01N 2900/1402; F01N 2900/1622; Y02T 10/24; B01D 53/9418
USPC .......... 423/213.2; 60/274, 301; 422/108, 110, 422/111
See application file for complete search history.

(56) References Cited

U.S. PATENT DOCUMENTS

| | | | |
|---|---|---|---|
| 8,393,143 B2 | 3/2013 | Walz et al. ....................... 60/295 |
| 2010/0122524 A1* | 5/2010 | Solbrig ........................... 60/285 |
| 2010/0242454 A1 | 9/2010 | Holderbaum ................... 60/301 |
| 2011/0265452 A1* | 11/2011 | Geveci et al. .................... 60/274 |
| 2012/0144801 A1* | 6/2012 | Levijoki et al. ................. 60/274 |
| 2012/0311996 A1* | 12/2012 | Balenovic et al. .............. 60/274 |
| 2013/0115152 A1* | 5/2013 | Nordberg et al. ............. 423/212 |

FOREIGN PATENT DOCUMENTS

| | | | |
|---|---|---|---|
| DE | 102008017543 A1 | 10/2008 | ................ F01N 3/10 |
| DE | 102008041603 A1 | 3/2010 | .............. F01N 11/00 |
| WO | 2009/036780 A1 | 3/2009 | ............. B01D 53/94 |

OTHER PUBLICATIONS

International Search Report and Written Opinion, Application No. PCT/EP2012/050157, 15 pages, May 25, 2012.

* cited by examiner

*Primary Examiner* — Timothy Vanoy
(74) *Attorney, Agent, or Firm* — King & Spalding L.L.P.

(57) ABSTRACT

A method is disclosed for operating an exhaust gas catalytic converter designed to reduce nitrogen oxides in an exhaust gas flow using a solution that contains urea and that reacts to form at least ammonia in the exhaust gas flow. The method may include: introducing an amount of the solution containing urea upstream of the exhaust gas catalytic converter until an ammonia slip through the exhaust gas catalytic converter; determining a first actual value of the loading state of the catalytic converter with ammonia at the time of the slip; determining a first estimated value of the loading state at the time of the slip by means of a dynamic model for the loading; subsequently draining the ammonia from the catalytic converter; determining a second actual value of the loading state of the exhaust gas catalytic converter with the solution containing urea when the catalytic converter is drained as specified.

15 Claims, 4 Drawing Sheets

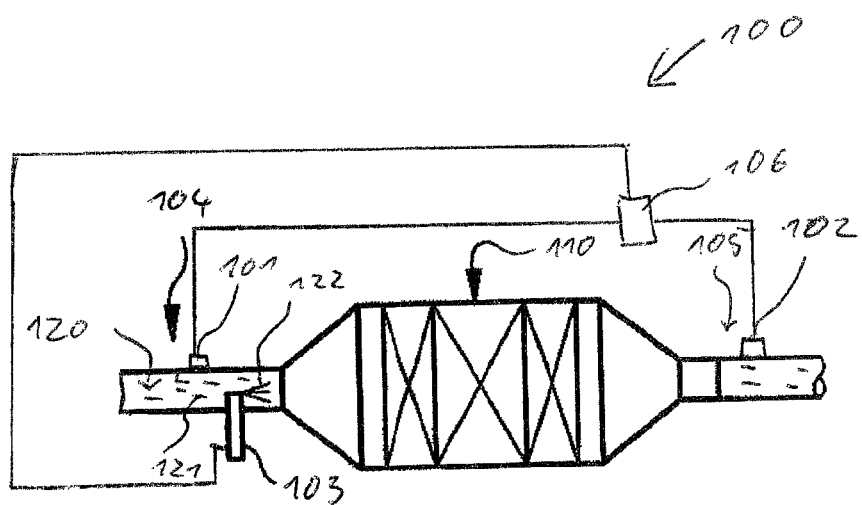

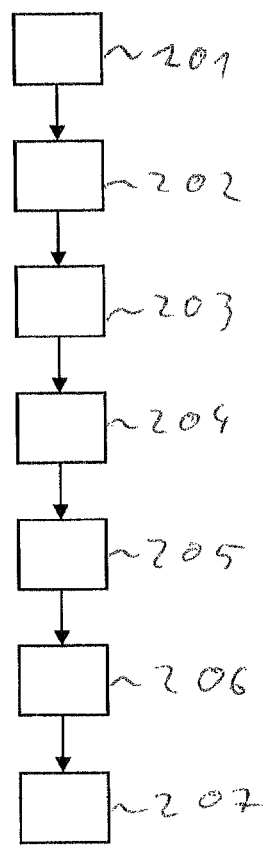

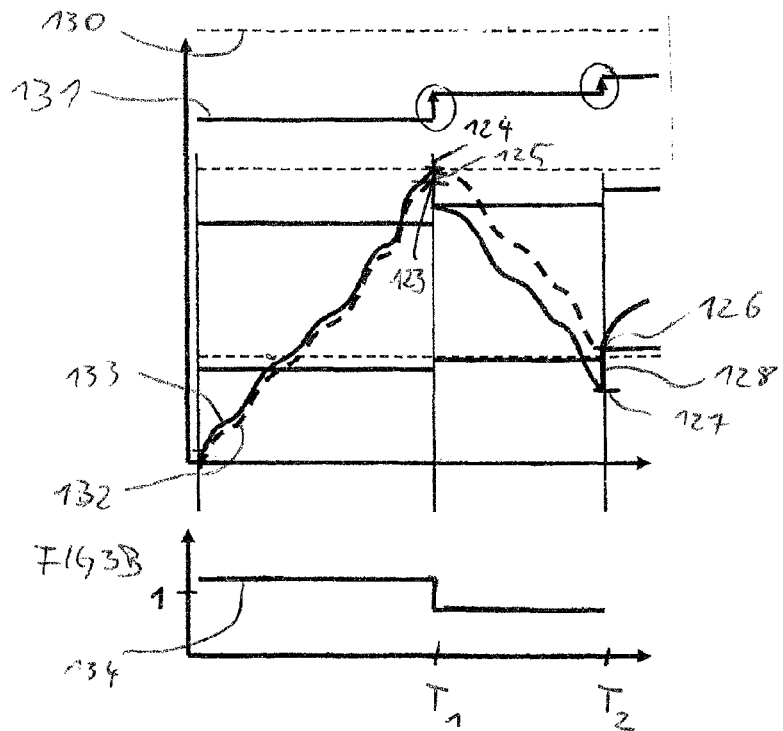
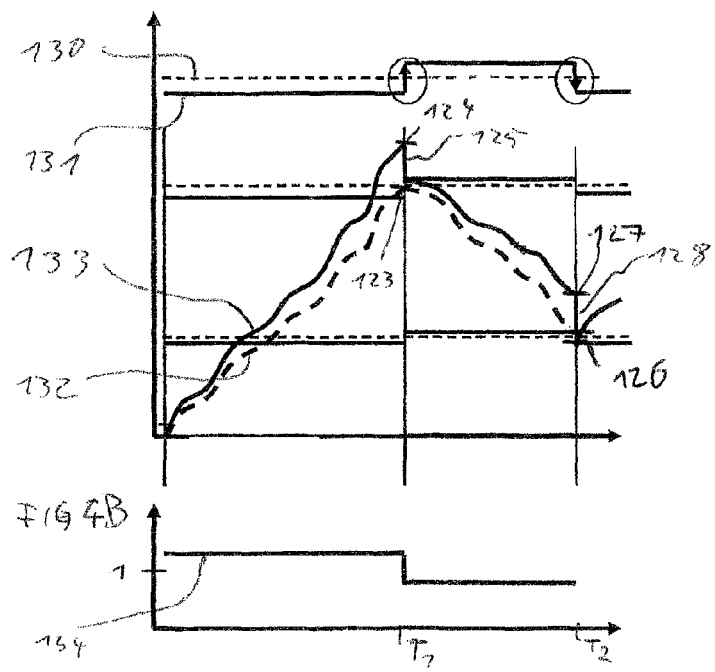

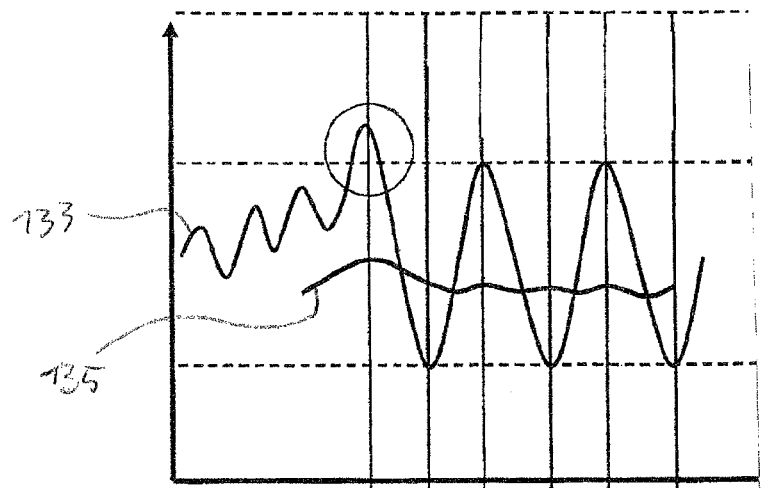
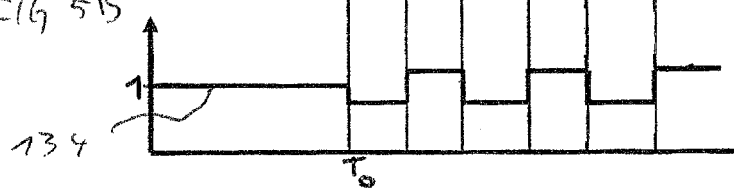
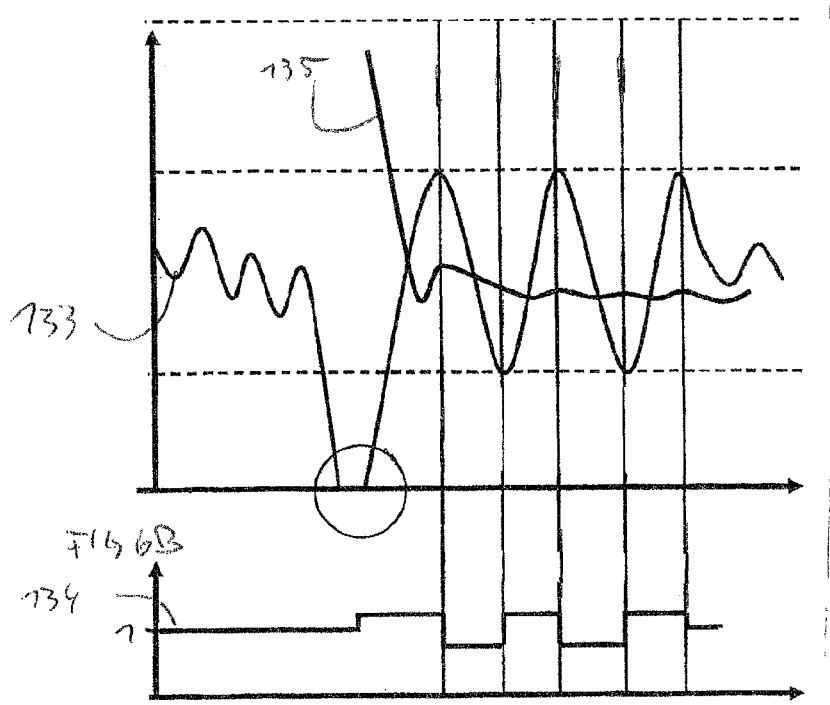

EXHAUST GAS CATALYTIC CONVERTER SYSTEM AND METHOD FOR OPERATING AN EXHAUST GAS CATALYTIC CONVERTER

CROSS-REFERENCE TO RELATED APPLICATIONS

This application is a U.S. National Stage Application of International Application No. PCT/EP2012/050157 filed Jan. 5, 2012, which designates the United States of America, and claims priority to DE Application No. 10 2011 008 380.4 filed Jan. 12, 2011, the contents of which are hereby incorporated by reference in their entirety.

TECHNICAL FIELD

This disclosure relates to a method for operating an exhaust gas catalytic converter and to an exhaust gas catalytic converter system which is designed to carry out such a method.

BACKGROUND

In order to reduce a nitrogen oxide content in the exhaust gas of an internal combustion engine, exhaust gas post-treatment can be carried out with an aqueous reducing agent solution and a catalytic converter. The aqueous reducing agent solution is, in particular, a urea-containing solution which is injected into what is referred to as an SCR (Selective Catalytic Reduction) catalytic converter. For this purpose, the urea-containing solution is pumped by means of a fluid pump to an injection valve which meters the urea-containing solution upstream of the catalytic converter into an exhaust gas flow into an exhaust gas section of the internal combustion engine. The reducing agent solution preferably reacts in the hot exhaust gas flow to form ammonia and carbon dioxide. In the catalytic converter, the ammonia then reacts with the nitrogen oxide mixture of the exhaust gas to form nitrogen and water. The efficiency of the catalytic converter is influenced by manufacturing-related or storage-related tolerances in the catalytic converter system.

It is desirable to specify a method for operating an exhaust gas catalytic converter which operates reliably. Furthermore, it is desirable to specify an exhaust gas catalytic converter system which is designed to carry out such a method.

SUMMARY

One embodiment provides a method for operating an exhaust gas catalytic converter which is designed to reduce nitrogen oxides contained in an exhaust gas flow by means of a urea-containing solution which reacts in the exhaust gas flow to form at least ammonia, comprising: introducing an amount of the urea-containing solution upstream of the exhaust gas catalytic converter as far as an ammonia slip through the exhaust gas catalytic converter; determining a first actual value of the loading state of the exhaust gas catalytic converter with ammonia at the time of the slip; determining a first estimated value of the loading state at the time of the slip by means of a dynamic model for the loading; subsequently emptying the ammonia from the exhaust gas catalytic converter; determining a second actual value of the loading state of the exhaust gas catalytic converter with ammonia when the exhaust gas catalytic converter is emptied as predefined; determining a second estimated value of the loading state by means of the dynamic model for the loading when the exhaust gas catalytic converter is emptied; adapting at least one parameter of the dynamic model as a function of the two actual values and of the two estimated values.

In a further embodiment, the first actual value corresponds to complete loading of the exhaust gas catalytic converter with ammonia, and the second actual value corresponds to predefined emptying of the exhaust gas catalytic converter up to a predefined limiting value.

In a further embodiment, a parameter of the dynamic model, which is used to determine an estimated value for an injection amount, metered by means of a metering device, of the urea-containing solution into the exhaust gas catalytic converter, is adapted.

In a further embodiment, a parameter of the dynamic model, which is used to determine an estimated value for a capacity of the exhaust gas catalytic converter to store ammonia, is adapted.

In a further embodiment, the method comprises: determining a first difference between the first actual value and the first estimated value, and determining a second difference between the second actual value and the second estimated value; and adapting the at least one parameter of the dynamic model as a function of the first and second differences.

In a further embodiment, if the first difference and the second difference have different signs than one another, the parameter of the dynamic model which is used to determine an estimated value for a capacity of the exhaust gas catalytic converter to store ammonia is changed.

In a further embodiment, if the first difference and the second difference have the same sign, the parameter of the dynamic model which is used to determine an estimated value for the injection amount, metered by means of a metering device, of the urea-containing solution into the exhaust gas catalytic converter is changed.

In a further embodiment, the method comprises: determining an actual nitrogen oxide content of the exhaust gas flow downstream of the exhaust gas catalytic converter at a time; determining a difference between the determined actual nitrogen oxide content and an estimated nitrogen oxide content according to the dynamic model at the time; carrying out the method disclosed above when the determined difference is greater than a predefined limiting value.

Another embodiment provides an exhaust gas catalytic converter system designed to carry out any of the methods disclosed above.

BRIEF DESCRIPTION OF THE DRAWINGS

Example embodiments of the invention are discussed below with reference to the drawings, in which:

FIG. 1 shows a schematic illustration of a catalytic converter system according to an embodiment, FIG. 2 shows a flowchart of a method for operating the catalytic converter system according to FIG. 1, FIGS. 3A and 3B show diagrams of the profile of the loading state and of the injection amount according to an embodiment, FIGS. 4A and 4B show diagrams of the profile of the loading state and of the injection amount according to a further embodiment, FIGS. 5A and 5B show diagrams of the profile of the loading state and of the injection amount according to a further embodiment, and FIGS. 6A and 6B show a diagram of the profile of the loading state and of the injection amount according to a further embodiment.

DETAILED DESCRIPTION

Embodiments of the invention provide a method for operating an exhaust gas catalytic converter and an exhaust gas catalytic converter system which is involved with carrying out such method.

In one embodiment, the exhaust gas catalytic converter is designed to reduce nitrogen oxides contained in an exhaust gas flow by means of a urea-containing solution. An amount of the urea-containing solution is introduced upstream into the exhaust gas catalytic converter as far as an ammonia slip through the exhaust gas catalytic converter. A first actual value of the loading state of the exhaust gas catalytic converter with ammonia is determined at the time of the slip. A first estimated value of the loading state is determined at the time of the slip by means of a dynamic model for the loading. Subsequently, the ammonia is emptied from the exhaust gas catalytic converter. A second actual value of the loading state of the exhaust gas catalytic converter with ammonia is determined when the exhaust gas catalytic converter is emptied as predefined. A second estimated value of the loading state is determined by means of the dynamic model for the loading when the exhaust gas catalytic converter is emptied. At least one parameter of the dynamic model is adapted as a function of the two actual values and of the two estimated values.

According to the method, an actual detected loading state of the exhaust gas catalytic converter is compared with an estimated value of the loading state according to the model when a slip of the ammonia occurs through the exhaust gas catalytic converter. Slip of the ammonia is referred to when ammonia passes through the exhaust gas catalytic converter into the regions of the exhaust gas system located downstream of the exhaust gas catalytic converter. This occurs when a predefined loading limit of the maximum loading capacity, for example 70% of the maximum loading capacity, of the exhaust gas catalytic converter is exceeded. In particular, a slip occurs if the exhaust gas catalytic converter is completely filled with ammonia up to the maximum loading capacity.

Furthermore, according to the method the actual loading state and the estimated value are determined according to the model when the exhaust gas catalytic converter is emptied. The first actual value is compared with the first estimated value, and the second actual value is compared with the second estimated value. The result of the first comparison is compared in turn with the result of the second comparison. The at least one parameter of the model is adapted as a function thereof.

As a result, according to embodiments both the parameter of the model which is used to determine an estimated value for a capacity of the exhaust gas catalytic converter to store ammonia is adapted as well as the parameter which is used to determine an estimated value for the injection amount, metered by means of a metering device, of the urea-containing solution into the exhaust gas catalytic converter. As a result, cross-compensation between the adaptation of the two parameters can be avoided or prevented, and as a result the exhaust gas catalytic converter can be operated reliably.

In embodiments, the method comprises determining a first difference between the first actual value and the first estimated value and determining a second difference between the second actual value and the second estimated value. If the first difference and the second difference have different signs than one another, the parameter of the dynamic model which is used to determine an estimated value for a capacity of the exhaust gas catalytic converter to store ammonia is adapted. If the first difference and the second difference have the same sign, the parameter of the dynamic model which is used to determine an estimated value for the injection amount, metered by means of the metering device, of the urea-containing solution into the exhaust gas catalytic converter is adapted.

In particular, the method is carried out if a difference of a determined actual nitrogen oxide content of the exhaust gas flow downstream of the exhaust gas catalytic converter and an estimated nitrogen oxide content according to the dynamic model is greater than a predefined limiting value. This means that the actual nitrogen oxide content downstream of the exhaust gas catalytic converter differs from the dynamic model by more than a predefined value.

FIG. 1 shows a schematic illustration of an exhaust gas catalytic converter system 100. The system 100 is arranged in an exhaust gas section of an internal combustion engine of a motor vehicle. The system 100 comprises an exhaust gas catalytic converter 110 for performing selective catalytic reduction (SCR catalytic converter). Furthermore, a metering device 103, in particular an injection valve, is arranged upstream of the exhaust gas catalytic converter 110. The injection valve 103 is coupled to a tank (not shown) which contains the reducing agent for the exhaust gas catalytic converter, in particular a urea-containing solution 122, also referred to as an aqueous urea solution, is kept available in the tank. During operation, the aqueous urea solution 122 is metered via the injection valve 103 into an upstream side 104 into the exhaust gas catalytic converter 110. The urea-containing solution 122 is injected, in particular, into a hot exhaust gas flow 120 which contains nitrogen oxides (NOx) 121. The urea-containing solution 122 reacts in the hot exhaust gas flow 120 to form ammonia ($NH_3$) and carbon dioxide. The ammonia then reacts with the nitrogen oxides 121 in the catalytic converter 110 to form nitrogen and water, with the result that the nitrogen oxide content of the exhaust gas flow 120 on a downstream side 105 of the exhaust gas catalytic converter 110 is reduced with respect to the upstream side 104. The exhaust gas catalytic converter 110 has a loading capacity 130 (FIGS. 3A and 4A) up to which the exhaust gas catalytic converter can store a quantity of ammonia.

The system 100 also comprises a first and a second nitrogen oxide sensor 101 and 102, respectively. The nitrogen oxide sensor 101 is arranged on the upstream side 104 of the exhaust gas catalytic converter 110. The nitrogen oxide sensor 102 is arranged on the downstream side 105 of the exhaust gas catalytic converter 110. The nitrogen oxide sensors 101 and 102 as well as the injection valve 103 are coupled to a control device 106. The control device 106 is designed to evaluate measurement signals of the nitrogen oxide sensors 101 and 102. Furthermore, the measuring device 106 is designed to control the injection valve 103.

The control device 106 is designed, in particular, to determine the nitrogen oxide concentration of the exhaust gas flow 120 on the upstream side 104 of the exhaust gas catalytic converter 110 by means of the nitrogen oxide sensor 101. Furthermore, the control device 106 is designed to determine a nitrogen oxide concentration 135 (FIGS. 5A and 6A) an exhaust gas flow on the downstream side 105 by means of the nitrogen oxide sensor 102. The control device 106 is designed to determine a reducing efficiency of the exhaust gas catalytic converter from the nitrogen oxide concentrations determined by means of the nitrogen oxide sensors 101 and 102. The control device 106 is designed to determine by what proportion the nitrogen oxide concentration in the exhaust gas flow 120 is reduced by means of the exhaust gas catalytic converter 110.

FIG. 2 shows a flowchart of the method for operating the exhaust gas catalytic converter system 100. In step 201, an amount of the urea-containing solution 122 is introduced into the exhaust gas catalytic converter 110 until a slip of the ammonia through the exhaust gas catalytic converter 110 is detected. In step 201, more urea-containing solution 122 is metered upstream of the exhaust gas catalytic converter 110 than is currently required to reduce the nitrogen oxides. As a result, the exhaust gas catalytic converter 110 is filled with ammonia. If the exhaust gas catalytic converter 110 is filled completely with ammonia up to its maximum loading capacity or if a predefined proportion of the maximum loading capacity, for example 70% of the loading capacity, is exceeded, a slip of the ammonia through the exhaust gas catalytic converter 110 occurs. This is the case, for example, at a time T1 of the FIGS. 3A and 3B or of the FIGS. 4A and 4B, respectively.

In step 202, at the time T1 of the slip an actual value 123 (FIGS. 3A and 4A) of the loading state of the exhaust gas catalytic converter with ammonia is determined. For example, the actual value 123 of an actual loading state 132 corresponds, at the time T1, to complete loading up to the maximum loading capacity of the exhaust gas catalytic converter 110. Alternatively, the actual value at the time T1 corresponds to the predefined proportion of the maximum loading capacity, for example 70% of the loading capacity of the exhaust gas catalytic converter 110.

In step 204, an estimated value 124 for an estimated loading state 133 (FIGS. 3A and 4A) is determined by means of the dynamic model. In particular, the dynamic model depends on information or measured values of the nitrogen oxide sensor 101 arranged upstream of the catalytic converter, the air mass throughput rate through the catalytic converter and a throughput rate of the urea-containing solution through the system. From these input variables, the estimated value 124 of the amount of ammonia present in the exhaust gas catalytic converter is determined, for example using the dynamic model.

Subsequently, in step 204 the ammonia is removed from the exhaust gas catalytic converter 110. For this purpose, for example less urea-containing solution 122 is metered to the exhaust gas catalytic converter 110 by means of the injection valve 103 than is currently necessary for the reduction of the nitrogen oxides in the exhaust gas flow. As a result, the ammonia which is stored in the exhaust gas catalytic converter is used for reduction and the filling state 132 of the ammonia in the exhaust gas catalytic converter 110 is lowered.

In a further embodiment, the metering of the urea-containing solution 122 is stopped after the time T1 and the exhaust gas catalytic converter 110 is therefore emptied.

The exhaust gas catalytic converter 110 is emptied until a predefined value of emptying is reached, for example until the exhaust gas catalytic converter 110 is completely or almost completely emptied.

In step 205 a second actual value 126 of the loading state 132 of the exhaust gas catalytic converter with ammonia is determined when the exhaust gas catalytic converter is emptied. The second actual value 126 corresponds, for example, to a completely emptied exhaust gas catalytic converter.

In order to determine an emptied exhaust gas catalytic converter, the injection amount the injection amount of the urea-containing solution is increased again after a time T2 which is after the time T1 and is representative of a time at which the exhaust gas catalytic converter is discharged. If the measured nitrogen oxide concentration at the nitrogen oxide sensor 102 decreases after the time T2, emptying of the exhaust gas catalytic converter was occurring since the increasing amount of ammonia brings about better conversion.

In a comparable fashion, complete loading can be detected if, in the event of an increase in the quantity of urea-containing solution, for example just before the time T1 up to the time T1, leads to a rise in the determined nitrogen oxide concentration at the sensor 102 since, as already explained, an ammonia slip occurs when the exhaust gas catalytic converter 110 is overfilled, and, owing to cross-sensitivity of the sensor 102, said slip brings about a rise in the sensor signal of the sensor 102.

In step 206, a second estimated value 127 of the loading state is determined by means of the dynamic model for the loading when the exhaust gas catalytic converter 110 is emptied. The second actual value and the second estimated value are determined at the common time T2 (FIGS. 3A and 3B as well as FIGS. 4A and 4B).

In step 207, at least one parameter of the dynamic model is adapted as a function of the two actual values 123, 126 and the two estimated values 124, 127. In particular, either the parameter which is used to determine estimated values for the capacity of the exhaust gas catalytic converter 110 to store ammonia is adapted, or the parameter which is used to determine estimated values for an injection amount, metered by means of the injection valve 103, of the urea-containing solution 122 into the exhaust gas catalytic converter 110 is adapted.

FIG. 3A shows a profile of the particular actual loading state 132 and of the loading state 133 according to the dynamic model.

FIG. 3B illustrates a ratio 134 between the injected amount of urea-containing solution 122 and the amount actually required for the reduction. If the ratio is greater than 1, more urea-containing solution 122 is injected than is currently necessary to reduce the nitrogen oxides. If the ratio<1, less urea-containing solution 122 is injected than is used for the reduction.

Up to the time T1, more urea-containing solution 122 is injected into the exhaust gas catalytic converter 110 than is used for reduction. During this time, both the actual loading state 132 and the loading state 133, which is determined by means of the dynamic model, increase. An actual loading capacity 130 (FIG. 3A) is constant during the entire time which is represented. A loading capacity 131, which is determined by means of the dynamic model, is constant up to the time T1, but differs from the actual loading capacity 130.

At the time T1, a slip of the ammonia through the exhaust gas catalytic converter 110 is detected, and the actual value 123 as well as the estimated value 124 of the loading state of the exhaust gas catalytic converter 110 at time T1 are determined. Furthermore, a difference 125 between the actual value 123 and the estimated value 124 is determined.

After the time T1, less urea-containing solution 122 is injected into the exhaust gas catalytic converter 110 than is required for reduction. The actual loading state 132 and the loading state 133, determined by means of the dynamic model, correspondingly decrease. At the time T2, emptying of the exhaust gas catalytic converter 110 is determined. After the time T2, the injected amount of urea-containing solution is increased again. At the time T2, the second actual value 126 and the second estimated value 127 are determined. A difference 128 between the actual value 126 and the estimated value 127 is determined.

From a comparison of the difference 125 with the difference 128 it is determined whether a parameter of the dynamic model deviates from the actual parameters of the system by more than one predefined limiting value, and is to be correspondingly adapted. Four cases are differentiated:

1. At the time T1, the estimated value 124 is above the actual value 123, and at the time T2 the estimated value 127 is below the actual value 126 (FIG. 3A).
2. At the time T1, the estimated value 124 is below the actual value 123, and at the time T2 the estimated value 127 is above the actual value 126.
3. At the time T1, the estimated value 124 is above the actual value 123, and at the time T2 the estimated value 127 is above the actual value 126 (FIG. 4A).
4. At the time T1, the estimated value 124 is below the actual value 123, and at the time T2 the estimated value 127 is below the actual value 126.

In 1. and 2., the differences 125 and 128 have opposite signs. In the case of 1. the loading capacity stored in the model is exceeded both at the time T1 and at the time T2 and the model is correspondingly adapted. In the case of 2. the loading capacity which is stored in the model is not reached either at the time T1 or at the time T2, and the model is correspondingly adapted. In the case of 1. the storage capacity of the exhaust gas catalytic converter 110 which is stored in the model is increased or the parameter used for the determining process is correspondingly adapted. In the case of 2. the storage capacity of the exhaust gas catalytic converter 110 which is stored in the model is reduced or the parameter used for the determining process is correspondingly adapted.

In the case of 3. and 4. the differences 125 and 128 have the same signs. It is concluded that the parameter of the dynamic model which is used to determine an estimated value for the metered injection amount of the urea-containing solution is to be adapted. In the case of 3. overdosing occurs, that is to say the actual amount of the metered urea solution is greater than the estimated quantity which is determined by means of the model. In the case of 4. under-dosing occurs, that is to say the actual amount of metered urea solution is less than the amount determined by means of the model. The parameter of the model used for the determining process is correspondingly adapted.

FIG. 5A shows a profile of the loading state 133 according to the dynamic model. Up to a time T0, as much urea-containing solution 122 is introduced into the exhaust gas catalytic converter 110 as is necessary for reducing the nitrogen oxides 121 (cf. FIG. 5B). Nevertheless, the loading state 133 which is determined by means of the dynamic model increases. At the time T0 the estimated loading state 133 leaves a predefined corridor or is greater than the predefined limiting value. This is used as a starting time for the method in FIGS. 2 and 3A, 3B and 4A, 4B. Subsequently, at T0, in an alternating fashion over a predefined time period in each case, less or more urea-containing solution is introduced into the exhaust gas catalytic converter than is currently used for reducing the nitrogen oxides.

Alternatively or additionally, the method can also be started when the catalytic converter 110 is completely emptied, for example if diesel particle filter regeneration has taken place, as illustrated in FIG. 6A. The diesel particle filter is arranged in the exhaust gas section of the internal combustion engine of the motor vehicle. During the regeneration, high temperatures occur at which the storage capacity of the exhaust gas catalytic converter is near to zero. If the method is started after such regeneration, an actual loading state 133 equal to zero is assumed, and this is used as a predefined starting point.

In addition, in FIGS. 5A and 6A the nitrogen oxide content 135 according to the sensor 102 is illustrated.

In further embodiments, in order to determine emptying or maximum filling the injection amount at the corresponding times T1 and T2, respectively, is reduced. Emptying is correspondingly occurring if the signal of the sensor 102 rises further owing to the even poorer reduction efficiency. If the signal of the sensor 102 drops, complete filling is inferred owing to the decreasing slip of the ammonia.

In further embodiments, in the case of an assumed emptied exhaust gas catalytic converter the injection amount is increased (at the time T2), and in the case of an assumed filled exhaust gas catalytic converter the injection amount is reduced (at the time T1). The emissions are therefore kept low.

In yet more embodiments, the method is carried out periodically according to FIG. 2, for example at a predefined distance traveled or at a predefined operating period.

What is claimed is:

1. A method for operating an exhaust gas catalytic converter configured to reduce nitrogen oxides contained in an exhaust gas flow by a urea-containing solution which reacts in the exhaust gas flow to form at least ammonia, the method comprising:
   introducing an amount of the urea-containing solution upstream of the exhaust gas catalytic converter as far as an ammonia slip through the exhaust gas catalytic converter;
   determining a first actual value of the loading state of the exhaust gas catalytic converter with ammonia at the time of the slip;
   determining a first estimated value of the loading state at the time of the slip using a dynamic model for the loading;
   subsequently emptying the ammonia from the exhaust gas catalytic converter;
   determining a second actual value of the loading state of the exhaust gas catalytic converter with ammonia when the exhaust gas catalytic converter is emptied as predefined;
   determining a second estimated value of the loading state using the dynamic model for the loading when the exhaust gas catalytic converter is emptied; and
   adapting at least one parameter of the dynamic model as a function of the two actual values and of the two estimated values.

2. The method of claim 1, wherein the first actual value corresponds to complete loading of the exhaust gas catalytic converter with ammonia, and the second actual value corresponds to predefined emptying of the exhaust gas catalytic converter up to a predefined limiting value.

3. The method of claim 2, comprising adapting a parameter of the dynamic model that is used to determine an estimated value for an injection amount, metered by a metering device, of the urea-containing solution into the exhaust gas catalytic converter.

4. The method of claim 3, comprising adapting a parameter of the dynamic model that is used to determine an estimated value for a capacity of the exhaust gas catalytic converter to store ammonia.

5. The method of claim 4, comprising:
   determining a first difference between the first actual value and the first estimated value,
   determining a second difference between the second actual value and the second estimated value, and
   adapting the at least one parameter of the dynamic model as a function of the first and second differences.

6. The method of claim 5, comprising, if the first difference and the second difference have the same sign, changing the parameter of the dynamic model which is used to determine an estimated value for the injection amount, metered by a metering device, of the urea-containing solution into the exhaust as catalytic converter.

7. The method of claim 2, comprising adapting a parameter of the dynamic model that is used to determine an estimated value for a capacity of the exhaust gas catalytic converter to store ammonia.

8. The method of claim 7, comprising:
determining a first difference between the first actual value and the first estimated value,
determining a second difference between the second actual value and the second estimated value, and
adapting the at least one parameter of the dynamic model as a function of the first and second differences.

9. The method of claim 8, comprising, if the first difference and the second difference have different signs than one another, changing the parameter of the dynamic model used to determine an estimated value for a capacity of the exhaust gas catalytic converter to store ammonia.

10. A method for operating art exhaust gas catalytic converter configured to reduce nitrogen oxides contained in an exhaust gas flow by a urea-containing solution which reacts in the exhaust gas flow to form at least ammonia, the method comprising:
determining art actual nitrogen oxide content of the exhaust gas flow downstream of the exhaust gas catalytic converter at a time;
determining a difference between the determined actual nitrogen oxide content and an estimated nitrogen oxide content according to the dynamic model at the time; and
in response to determining that the determined difference is greater than a predefined limiting value:
introducing an amount of the urea-containing solution upstream of the exhaust as catalytic converter as far as an ammonia slip through the exhaust gas catalytic converter;
determining a first actual value of the loading state of the exhaust gas catalytic converter with ammonia at the time of the slip;
determining a first estimated value of the loading state at the time of the slip using a dynamic model for the loading;
subsequently emptying the ammonia from the exhaust gas catalytic converter;
determining a second actual value of the loading state of the exhaust gas catalytic converter with ammonia when the exhaust gas catalytic converter is emptied as predefined;
determining a second estimated value of the loading state using the dynamic model for the loading when the exhaust as catalytic converter is emptied; and
adapting at least one parameter of the dynamic model as a function of the two actual values and of the two estimated values.

11. The method of claim 10, wherein the first actual value corresponds to complete loading of the exhaust gas catalytic converter with ammonia, and the second actual value corresponds to predefined emptying of the exhaust gas catalytic converter up to a predefined limiting value.

12. The method of claim 11, comprising adapting a parameter of the dynamic model that is used to determine an estimated value for an injection amount, metered by a metering device, of the urea-containing solution into the exhaust gas catalytic converter.

13. The method of claim 11, comprising adapting a parameter of the dynamic model that is used to determine an estimated value for a capacity of the exhaust gas catalytic converter to store ammonia.

14. The method of claim 13, comprising:
determining a first difference between the first actual value and the first estimated value,
determining a second difference between the second actual value and the second estimated value, and
adapting the at least one parameter of the dynamic model as a function of the first and second differences.

15. The method of claim 14, comprising, if the first difference and the second difference have different signs than one another, changing the parameter of the dynamic model used to determine an estimated value for a capacity of the exhaust gas catalytic converter to store ammonia.

* * * * *